United States Patent

Bergmann et al.

[11] Patent Number: 5,534,627
[45] Date of Patent: Jul. 9, 1996

[54] POLYCYCLIC VAT DYES

[75] Inventors: Udo Bergmann, Bensheim; Harald Schlueter, Weisenheim; Michael Schmitt, Worms, all of Germany

[73] Assignee: BASF Aktiengesellschaft, Ludwigshafen, Germany

[21] Appl. No.: 288,310

[22] Filed: Aug. 10, 1994

[30] Foreign Application Priority Data

Aug. 10, 1993 [DE] Germany .................. 43 26 773.4

[51] Int. Cl.$^6$ .................................................. C09B 5/40
[52] U.S. Cl. ........................................................ 546/30
[58] Field of Search ............................................... 546/30

[56] References Cited

U.S. PATENT DOCUMENTS

| | | | |
|---|---|---|---|
| 995,936 | 6/1911 | Wolff | 546/30 |
| 1,850,562 | 3/1932 | Neresheimer et al. | |
| 1,877,947 | 9/1932 | Neresheimer et al. | 546/30 |
| 2,022,240 | 11/1935 | Honold et al. | 546/30 |
| 2,040,380 | 5/1936 | Honold et al. | 546/30 |
| 2,530,010 | 11/1950 | Fioroni | |

FOREIGN PATENT DOCUMENTS 233695  5/1964  Austria.

OTHER PUBLICATIONS

Bios Final Report 1493, p. 32.

*Primary Examiner*—Donald G. Daus
*Attorney, Agent, or Firm*—Oblon, Spivak, McClelland, Maier & Neustadt

[57] ABSTRACT

Polycyclic vat dyes of the general formula I

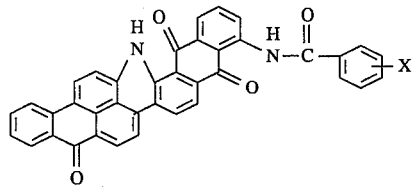

where X is hydrogen, $C_1$–$C_4$-alkyl, $C_1$–$C_4$-alkoxy, halogen or nitro, obtainable by reacting (9)-benzo-5-aminoanthraquinonyl(2,1-h)-8-azapyrenone-3(II)

with a benzoyl chloride of the formula III

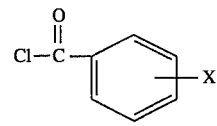

in a dipolar aprotic solvent.

7 Claims, No Drawings

POLYCYCLIC VAT DYES

The present invention relates to polycyclic vat dyes of the general formula I

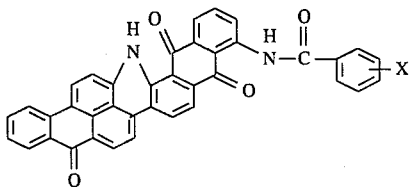

where X is hydrogen, $C_1$–$C_4$-alkyl, $C_1$–$C_4$-alkoxy, halogen or nitro, obtainable by reacting (9)-benzo-5-aminoanthraquinonyl(2,1-h)-8-azapyrenone-3(II)

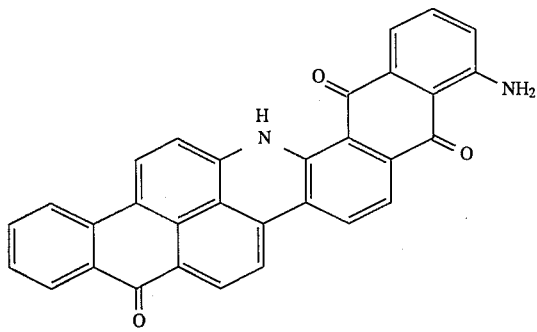

with a benzoyl chloride of the formula III

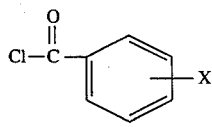

in a dipolar aprotic solvent.

The invention further relates to the preparation of these vat dyes.

As is well known, the vat dyes of the formula I are used for dyeing cotton and cotton-polyester blends in very fast olive shades. Of particular interest in this connection is the unsubstituted vat dye I (X=hydrogen; CAS No. 69515).

The known way of preparing the vat dyes I is to condense the azapyrenone II with a benzoyl chloride III in nitrobenzene (U.S. Pat. No. 1,850,562, U.S. Pat. No. 2,530,010, and DRP 520 876) or o-dichlorobenzene (BIOS Final Report 1493, 32) as solvent.

The disadvantage of this method is that, after the synthesized vat dyes have been isolated, which is generally done by filtration or distillative removal of the solvent, the product is still found to be contaminated by residual quantities of the solvents mentioned, which, because of the toxicity, have to be completely removed, which is only possible by means of a time- and energy-intensive steam distillation. Moreover, the condensation has to be carried out in the presence of large solvent quantities, resulting in a low space-time yield.

It is an object of the present invention to provide a process which does not have the disadvantages mentioned and which makes vat dyes of the formula I available in an advantageous manner.

We have found that this object is achieved by the vat dyes I defined at the beginning.

The invention further provides the thereby defined process for preparing these vat dyes.

Suitable X includes in particular, for example, ethyl, n-propyl, isopropyl, n-butyl, isobutyl, sec-butyl, ethoxy, propoxy, butoxy, fluorine, bromine and nitro, particularly methyl, methoxy and chlorine and very particularly hydrogen.

The vat dyes I according to the invention, which are obtainable by condensation of II with III in dipolar aprotic solvents, surprisingly produce—at the same fastness level—distinctly greener and cleaner olive dyeings than the dyes which are obtained by the conventional methods of synthesis and which, because of their browner shade, are not attractive for use as olive dyes.

Examples of dipolar aprotic solvents used according to the invention include, in addition to sulfoxides and sulfones, in particular carboxamides, especially aliphatic carboxamides, lactams and cyclic ureas derivatives.

Specific examples are dimethyl sulfoxide, sulfolane, dimethylformamide, diethylformamide, dibutylformamide, dimethylacetamide, diethylacetamide, dibutylacetamide, N-formylmorpholine, N-methylpyrrolidone, 1,3-dimethylimidazolidin-2-one and 1,3-dimethyltetrahydropyrimidin-2-one.

Preference is given to dimethylformamide, particular preference is given to 1,3-dimethylimidazolidin-2-one and 1,3-dimethyltetrahydropyrimidin-2-one and very particular preference is given to N-methylpyrrolidone and dimethylacetamide.

A further advantage of using the solvents according to the invention is that they make possible a distinctly more concentrated reaction batch than nitrobenzene and o-dichlorobenzene, as a result of which the space-time yield can be more than doubled. In addition, solvent residues adhering to the product are easy to remove completely by simply washing or stirring with water.

The preparative process of the invention generally uses from 1 to 7, preferably from 1 to 5, kg of solvent per kg of azapyrenone II. It is of course also possible to use larger amounts of solvent (weight ratio for example up to 10:1 or 15:1 or greater), but large solvent quantities make the workup uneconomical.

The molar ratio of benzoyl chloride III to azapyrenone II generally ranges from 3:1 to 1:1.

The reaction can be carried out in the presence or absence of acid-binding agents such as calcium oxide, calcium carbonate, magnesium oxide, sodium dihydrogenphosphate, disodium hydrogenphosphate, sodium formate, sodium acetate, especially sodium bicarbonate, sodium carbonate and trisodium phosphate.

If acid-binding agents are used, the amounts thereof are determined according to the amount of benzoyl chloride III. Customary amounts range from 1 to 3 mol equivalents of acid-binding agent per mole of III.

The reaction temperature generally ranges from 100° to 200° C., preferably from 140° to 170° C. Temperatures above the boiling point of the solvent used can be achieved by working under autogenous pressure in a closed apparatus, but working at atmospheric pressure is preferable.

Technically the process is advantageously carried out by initially charging the solvent and adding II and III with or without an acid-binding agent, heating the mixture with stirring to the desired temperature and generally holding it at that temperature for from 0.5 to 20 h, preferably from 2 to 6 h.

The vat dyes can be isolated directly from the hot or cold reaction suspension by filtration, for example on a filter press, washing with water and subsequent drying. The solvent is advantageously recovered from the mother and wash liquors by distillation.

However, the reaction mixture can also be evaporated to dryness, for example in a paddle dryer, if necessary under reduced pressure and with or without addition of an acid-binding agent. The vat dye obtained can then likewise be isolated, for example on a filter press, after suspension in water. The regenerated solvent obtained in the course of the evaporating step can be recirculated into the process, if desired after further distillation.

The process of the invention makes it possible to obtain the vat dyes of the formula I advantageously and in a purity not available with existing processes. The vat dyes I according to the invention produce distinctly more greenish and cleaner olive dyeings than the prior art.

EXAMPLES

A) Preparation of vat dyes I according to the invention

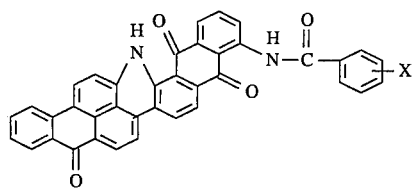 I was suspended in 2000 g of water at 60° C. by stirring for 1 h. The suspension was then filtered through a nutsche. The filter residue was washed salt-free and neutral with 2000 g of water and dried at 60° C. under reduced pressure.

Procedure C

The suspension was cooled down to 80° C., transferred into a rotary evaporator, neutralized with 80 g of sodium carbonate (Examples 5 to 7) or 480 g of sodium bicarbonate (Comparative Example) and concentrated to dryness under reduced pressure. The residue was suspended in 2000 g of water by stirring at 60° C. for 1 h and filtered, and the filter residue was washed neutral and salt-free with 2000 g of warm water (60° C.) and dried at 60° C. under reduced pressure.

Further details concerning these experiments and the comparative preparation in nitrobenzene (Example V) and the results thereof are given below in Table 1.

TABLE 1

| | | | | Prepartion of vat dyes I | | | | | |
|---|---|---|---|---|---|---|---|---|---|
| | | | | | | Acid-binding agent | | Workup | Yield | |
| | | a g of | b g of | Solvent | | | | | | |
| Ex. | X | II | III | L | x g | M | c g | procedure | [g] | Hue on cotton |
| 1 | H | 375 | 287 | N-methylpyrrolidone | 1000 | — | — | A | 430 | greenish olive |
| 2 | H | 375 | 290 | 1,3-dimethyl-imidazolidin-2-one | 1000 | — | — | A | 410 | greenish olive |
| 3 | H | 400 | 307 | dimethylacetamide | 1000 | Na$_2$CO$_3$ | 120 | B | 410 | greenish olive |
| 4 | H | 400 | 307 | dimethylacetamide | 1000 | Na$_3$PO$_4$ | 120 | B | 415 | greenish olive |
| 5 | H | 150 | 115 | dimethylacetamide | 400 | Na$_2$CO$_3$ * | 80 | C | 410 | greenish olive |
| V | H | 400 | 267 | nitrobenzene | 2400 | NaHCO$_3$ * | 480 | C | 420 | browner, duller olive |
| 6 | 3-CH$_3$ | 150 | 120 | dimethylacetamide | 400 | Na$_2$CO$_3$ * | 80 | C | 420 | greenish olive |
| 7 | 4-Cl | 150 | 120 | dimethylacetamide | 400 | Na$_2$CO$_3$ * | 80 | C | 417 | greenish olive |

* M was only added for the workup.

To x g of the solvent L were introduced with stirring a g of (9)-benzo-5-aminoanthraquinonyl(2,1-h)-8-azapyrenone-3 (II), b g of the corresponding benzoyl chloride III and optionally c g of the acid-binding agent M. The mixture obtained was then heated over 3 h to 150°–155° C. under reflux and stirred at that temperature for 3 h (Examples 1 to 4) or 5 h (Examples 5 to 7 and Comparative Example).

The reaction mixture was worked up for the vat dyes I by one of the following 3 procedures:

Procedure A

The suspension was cooled down to 40° C. and filtered through a nutsche. The filter residue was washed neutral and solvent-free with 2000 g of warm water (60° C.) and dried under reduced pressure at 60° C.

Procedure B

The suspension was, after cooling, transferred into a paddle dryer and concentrated to dryness under reduced pressure with distillative removal of the solvent. The residue B) Assessment of color properties on test dyeings The vat dyes I obtained were used to dye cotton fabric by the pad-steam method (F1) or the exhaust method (F2). The dyeings were then measured with the Texflash/Datacolor instrument model 3880 using the standard illuminant D 65 (measuring angle 0°= diffuse illumination, aperture side 30 mm, spot size 24 mm) to determine the CIELAB values chroma C* and hue angle H.

Pad-steam Dyeing (F1)

Scoured, readily wettable cotton fabric was dipped in an aqueous padding liquor containing per liter 50 g of the following aqueous dye preparation:

13 g of vat dye I
3.75 g of dispersant
10 g of antifreeze
0.5 g of preservative
22.75 g of water Then the fabric was squeezed off in a two-roll mangle to a residual moisture content of 80% and dried. After the usual application of alkaline dithionite solution the dye was fixed by steaming in an air-free saturated steam atmosphere for 60 sec. The continuous finishing was carried out in an open-width washer by rinsing, oxidizing, soaping and further rinsing.

Exhaust Dyeing (F2)

Scoured, readily wettable cotton fabric was dyed in a dyebath (liquor ratio 10:1) containing 26 ml/l of 38°Bé sodium hydroxide solution and 9 g/l of sodium dithionite (90% strength) and, based on the substrate weight, 4% by weight of a dye mixture of 40 parts of vat dye I, 60 parts of dispersant and 1 g/l of leveling assistant.

After the usual 40 minutes' dyeing at 60° C. the fabric was rinsed, oxidized, soaped and rinsed once more.

The outcome was in every case a deep, level, greenish olive dyeing without noticeable marking of immature cotton and with very good fastness properties.

Further information on the color properties is given in Table 2.

TABLE 2

| Color data of vat dyes I | | | | | |
|---|---|---|---|---|---|
| Dye of Ex. | Dyeing method | Chroma C* | Δ C | Hue angle H [°] | Δ H [°] |
| V | F1 | 14.73 | — | 103.7 | — |
| 3 | F1 | 14.40 | −0.33 | 108.4 | 1.20 |
| 5 | F1 | 14.25 | −0.48 | 109.0 | 1.34 |
| V | F2 | 14.85 | — | 102.6 | — |
| 3 | F2 | 15.72 | 0.87 | 109.8 | 1.92 |
| 5 | F2 | 15.50 | 0.65 | 110.6 | 2.11 |

The dyeings obtained with the dyes of the invention exhibit higher hue angle values, i.e. are greener and are perceived as more brilliant.

We claim:

1. Polycyclic vat dyes of the formula

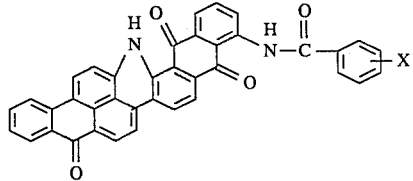

where X is hydrogen, $C_1$–$C_4$-alkyl, $C_1$–$C_4$-alkoxy, halogen or nitro, obtained by reacting (9)-benzo-5-aminoanthraquinonyl(2,1-h)-8-azapyrenone-3(II)

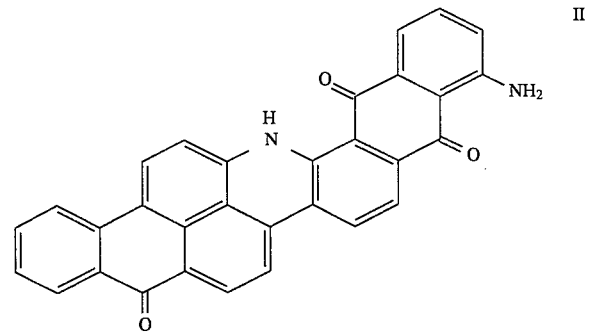

a benzoyl chloride of the formula III

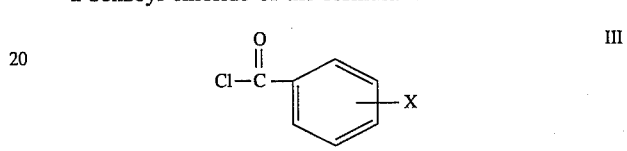

a dipolar aprotic solvent selected from the group consisting of aliphatic carboxamides, six-membered lactams, five or six-membered cyclic ureas, aliphatic sulfoxides and sulfones.

2. A polycyclic vat dye of the formula I as set forth in claim 1, wherein X is hydrogen.

3. Polycyclic vat dyes as claimed in claim 1, wherein the solvents used are selected from the group consisting of dimethylacetamide, dimethylformamide, N-methylpyrrolidone, 1,3-dimethyl-imidazolidine-2-one and 1,3-dimethyltetrahydropyrimidin-2-one.

4. A process for preparing the polycyclic vat dyes of claim 1, which comprises reacting (9)-benzo-5-aminoanthraquinonyl(2,1-h)-8-azapyrenone-3(II) with a benzoyl chloride (III) in a dipolar aprotic solvent selected from the group consisting of aliphatic carboxamides, six-membered lactams, five or six-membered cyclic ureas, aliphatic sulfoxides and sulfones.

5. Polycyclic vat dyes as claimed in claim 1, wherein the solvent used is dimethylacetamide.

6. Polycyclic vat dyes as claimed in claim 1, wherein the solvent used is N-methylpyrrolidone.

7. Polycyclic vat dyes as claimed in claim 1, wherein the solvent used is 1,3-dimethylimidazolidin-2-one.

* * * * *